(12) United States Patent
Ronnat et al.

(10) Patent No.: US 9,097,559 B2
(45) Date of Patent: Aug. 4, 2015

(54) NON-CONTACT MULTI-TURN ABSOLUTE POSITION MAGNETIC SENSOR COMPRISING A THROUGH-SHAFT

(75) Inventors: Yannick Ronnat, Vorges-les-Pins (FR); Gerald Masson, Besancon (FR)

(73) Assignee: MOVING MAGNET TECHNOLOGIES, Besancon (FR)

( * ) Notice: Subject to any disclaimer, the term of this patent is extended or adjusted under 35 U.S.C. 154(b) by 1382 days.

(21) Appl. No.: 12/670,316

(22) PCT Filed: Jul. 23, 2008

(86) PCT No.: PCT/FR2008/001093
§ 371 (c)(1),
(2), (4) Date: Mar. 24, 2010

(87) PCT Pub. No.: WO2009/047401
PCT Pub. Date: Apr. 16, 2009

(65) Prior Publication Data
US 2010/0194385 A1    Aug. 5, 2010

(30) Foreign Application Priority Data

Jul. 24, 2007 (FR) .................... 07 05373

(51) Int. Cl.
| *G01B 7/30* | (2006.01) |
| *G01D 5/245* | (2006.01) |
| *B62D 1/00* | (2006.01) |
| *B62D 15/02* | (2006.01) |
| *B62D 21/00* | (2006.01) |
| *B62D 47/00* | (2006.01) |

(52) U.S. Cl.
CPC ............... *G01D 5/2458* (2013.01); *B62D 1/00* (2013.01); *B62D 15/0245* (2013.01); *B62D 21/00* (2013.01); *B62D 47/00* (2013.01)

(58) Field of Classification Search
CPC .......... B62D 1/00; B62D 21/00; B62D 47/00; G01R 1/00
USPC ............... 324/207.25, 207.21, 207.24, 207.2, 324/207.11; 702/85; 180/412; 280/441.1; 303/191; 318/560; 370/436
See application file for complete search history.

(56) References Cited

U.S. PATENT DOCUMENTS

| 3,624,642 | A | * | 11/1971 | Tripp | ............................ 341/151 |
| 6,510,396 | B1 | * | 1/2003 | Colosky | ........................ 702/85 |
| 2005/0172732 | A1 | * | 8/2005 | Feng et al. | ............... 73/862.332 |
| 2008/0314164 | A1 | * | 12/2008 | Masson et al. | ........... 73/862.333 |

FOREIGN PATENT DOCUMENTS

| DE | 10 2004 053690 A1 | 5/2006 |
| EP | 1 342 647 A | 9/2003 |

(Continued)

*Primary Examiner* — Huy Q Phan
*Assistant Examiner* — Temilade S Rhodes-Vivour
(74) *Attorney, Agent, or Firm* — Arent Fox LLP

(57) ABSTRACT

The invention relates to an absolute position magnetic sensor for measuring the angular position, on a theta course, of a shaft passing through said sensor and comprising at least two systems for detecting the position of the shaft. Said invention is characterised in that: at least one of the detection systems generates a signal according to a "periodical" function of the theta/n period giving the periodical angular position of said shaft; at least one of the detection systems generates an absolute signal on a theta course of the shaft; and theta and n fit the equation:

Figure 11:
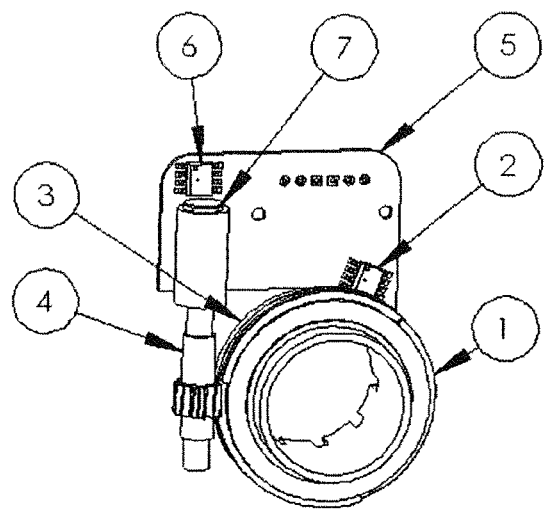

*theta/n*=360*$_n$*>1.

18 Claims, 13 Drawing Sheets

(56) References Cited

FOREIGN PATENT DOCUMENTS

| EP | 1 437 575 A | 7/2004 |
| EP | 1 536 217 A | 6/2005 |
| EP | 1536217 A1 * | 6/2005 |
| EP | 1 830 155 A | 9/2007 |
| WO | WO 2007/057563 A | 5/2007 |

* cited by examiner

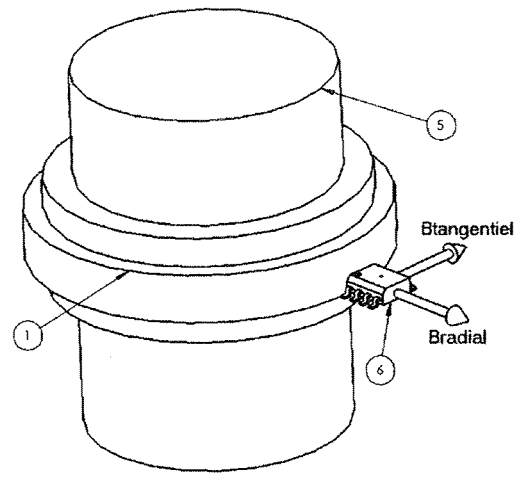
Fig.1 (Anterior art)
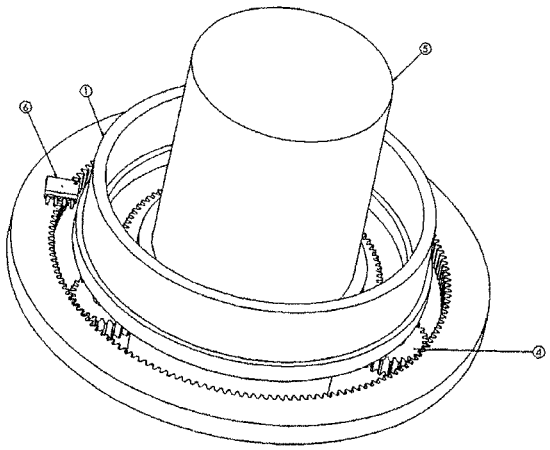
Fig.2 (Anterior art)

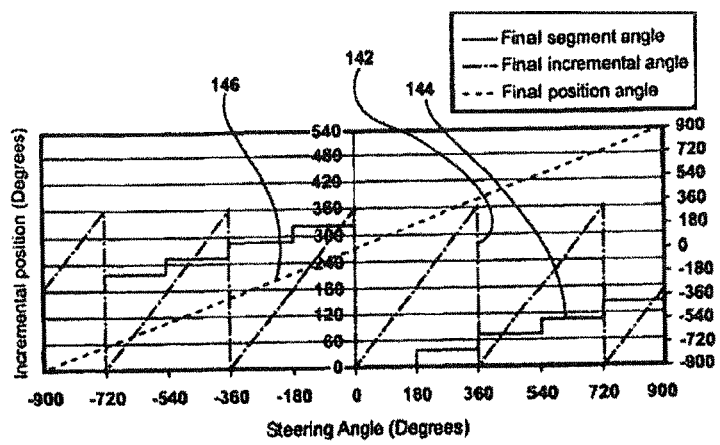
Fig.3 (Anterior art)
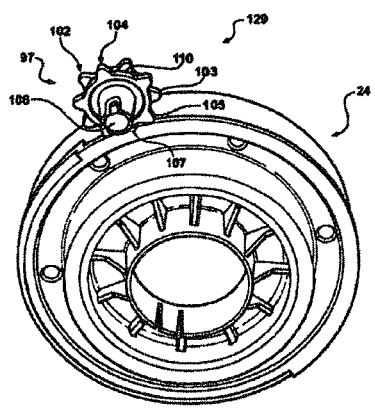
Fig.4 (Anterior art)

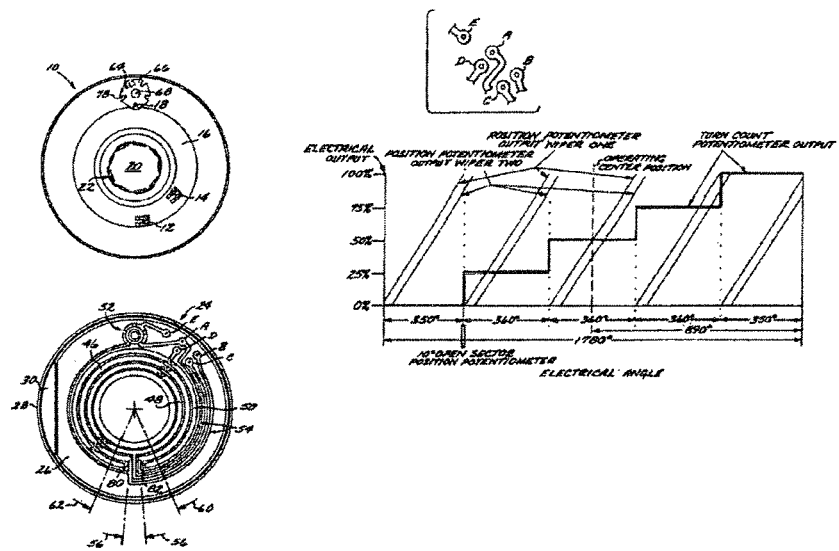
Fig.5 (Anterior art)
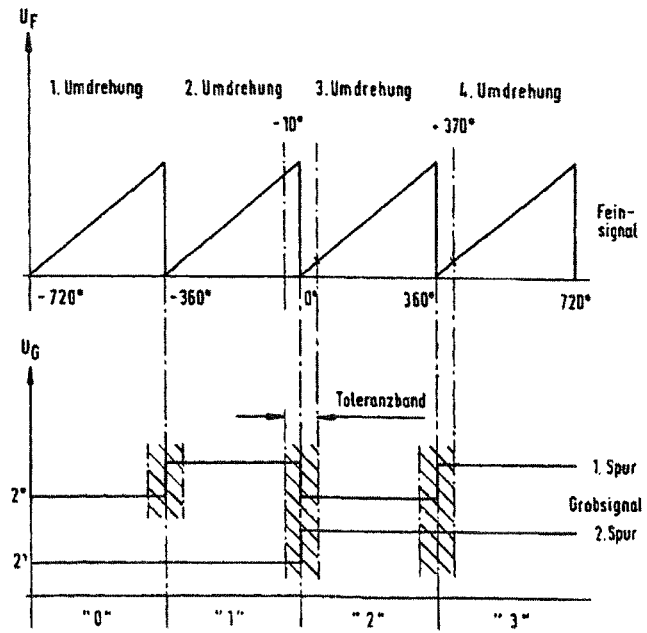
Fig.6 (Anterior art)

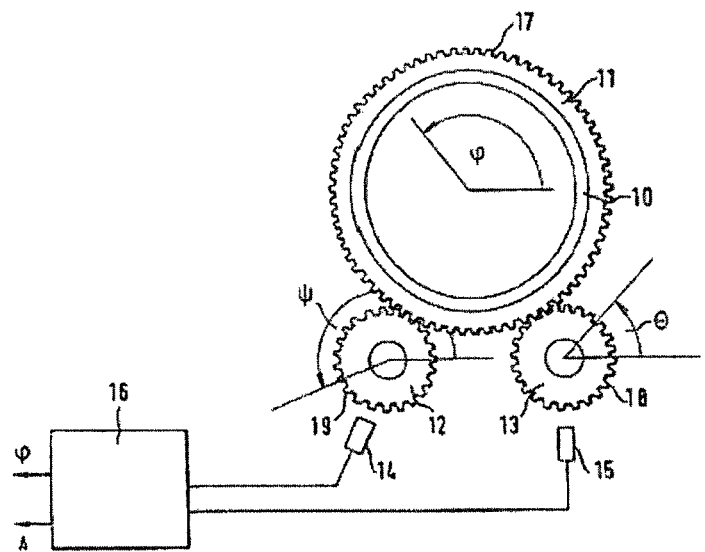
Fig.7 (Anterior art)
[FIG. 2]
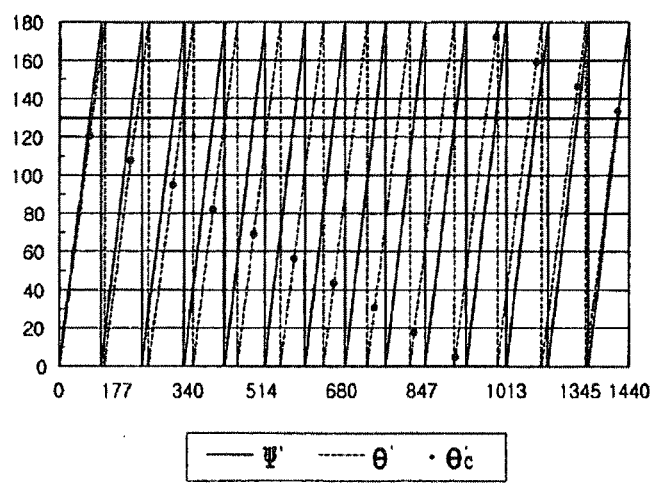
Fig.8 (Anterior art)

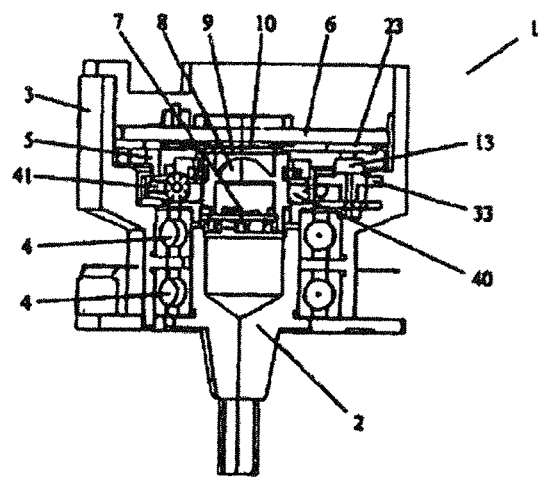
Fig.9 (Anterior art)
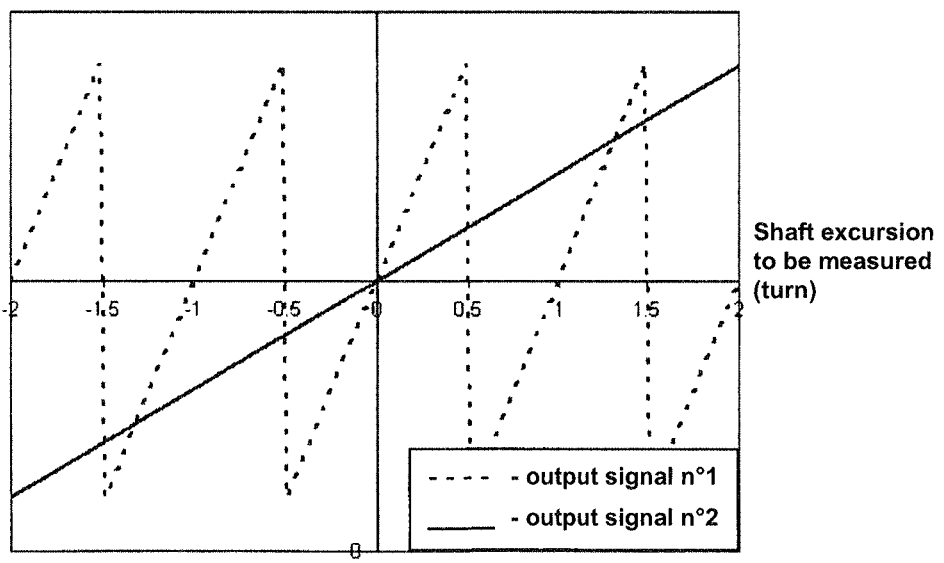
Figure 10

NON-CONTACT MULTI-TURN ABSOLUTE POSITION MAGNETIC SENSOR COMPRISING A THROUGH-SHAFT

CROSS-REFERENCE TO RELATED APPLICATION

This application is a National Stage entry of International Application No. PCT/FR2008/001093, filed Jul. 23, 2008, which claims priority of French Application No. 0705373, filed Jul. 24, 2007. The disclosure of the prior application is hereby incorporated in its entirety by reference.

This invention concerns the domain of rotary magnetic position sensors for angles greater than 360° and up to several revolutions, and more particularly position sensors for measuring angular position of a car steering column, without this application being exclusive.

The steering column and steering wheel angular position is a necessary information for functions such as Electronic Stability Program (ESP) and Electric Power Steering (EPS). The information regarding the steering angle, hence the angle of the wheels, can also be used for accessory functions such as directional headlights, trajectory control, automatic parking, etc.

A single-turn sensor by itself cannot detect the position of the column in most cars since the steering wheel needs to make at least two turns. A solution may reside in associating a 360° sensor to a "top turn" in order to know at which turn the steering wheel is (e.g. WO07014599). But such systems assume an initial position when powering on.

All positions that follow are relative to this starting position. Therefore the problem resides that this opening position is redefined each time the car ignition is turned on. This means that if such system has no memory of the last position of the steering wheel angle, or if the angle is changed after ignition is turned off, the angle indicated when ignition is turned back on will be wrong.

Moreover, specifications for application to a column are very strict. Indeed such application requires an absolute sensor with a range up to +/−720° or even +/−1440° with accuracy of less than +/−2° and resolution of less than 0.1°.

In order to achieve this, various absolute multi-turn solutions exist for angle measurement, and they implement various technologies: potentiometric, optic, inductive, or else magnetic. . . .

Optic solutions as described, e.g. in patents EP1 219 527 or U.S. Pat. No. 6,848,187, are complex, expensive and can prove to be incompatible with an installation in the motor compartment, because of their incompatibility with the temperature and environment conditions.

Inductive solutions are very expensive in terms of development and adjustment on a steering column (U.S. Pat. No. 6,384,598).

Potentiometric solutions have great advantages mainly from their cost and simplicity.

For example, one knows in the state of the art, U.S. Pat. No. 5,200,747 presenting an absolute multi-turn sensor, comprising two 360° potentiometric sensors. The first potentiometer is used to measure the rotation angle of the rotary organ from 0 to 360°, and the second potentiometer is used to determine the number of complete rotations of the rotary organ. The rotor of the second potentiometer is driven by a single tooth wheel sprocket system, where the single tooth wheel is linked to the first potentiometer. Each time that first potentiometer completes a turn, the single tooth of the wheel is meshed with the sprocket (call a "Geneva" drive) that makes the second potentiometer rotor turn of a preset angle. The displacement of the second potentiometer is therefore incremental, and its position is incremented at each turn of the first potentiometer. By determining the output of both potentiometers, the absolute angle of the rotary organ can be determined.

Two major inconveniences can be noted with this solution. The first being that the proposed solution is achieved with friction between the contact and the potentiometer tracks, which reduces the sensor life span. Moreover, the tracks can deteriorate upon contact with dust, oil, or other fluids. The second major inconvenience is the incremental character of the second potentiometer. In case the first potentiometer fails, the second can neither detect even roughly the rotary organ position within the turn, nor can it detect the first potentiometer failure.

Also known in state of the art, are solutions without magnetic contact that calculate the absolute position of a rotary organ from the continuous phase difference of two rotary sensors, as described e.g. in patents and applications US2005000288286, JP2006119082, U.S. Pat. No. 6,941,241, U.S. Pat. No. 5,930,905, U.S. Pat. No. 6,466,889. The principle of such sensors is identical: they are composed of a sprocket wheel linked to the column, driving 2 pinions with a slightly different number of teeth, each united to a magnet. Each magnet rotation is detected by a magnet sensitive sensor then the signals in phase shift are processed with an algorithm. The measured accuracy of the absolute angle depends thus on the difference between two signals from two different sensors, and also on the calculation algorithm. Subtracting two signals to obtain a single measure is a big inconvenience. It decreases the accuracy by two as compared to the accuracy of either sensor taken alone. The slightest error of either sensor, the slightest mechanical phase difference, the slightest gap in one of the gears, leads to an error when measuring the angle. Moreover, a very elaborate algorithm is required to calculate the absolute angle of the rotary organ.

The period of each signal is tiny compared to the period of the rotary organ (360°). This means that the signal alone of one of the two sensors cannot even provide a rough information of the rotary organ position. This is a problem in case of sensor failure that cannot be diagnosed using the signal from the other sensor.

In the state of the art, application WO 2005/076860 is known for describing an absolute multi-turn torque and position sensor, where the measurement of the rotary organ position follows the principle of U.S. Pat. No. 5,200,747 i.e., the position measurement is done using two sensors: a 360°sensor directly linked to the rotary organ, and a second incremental sensor driven by a Geneva drive. Unlike U.S. Pat. No. 5,200,747, the type of sensors used is not potentiometric but non-contact magnetic. Each of the two sensors presents a magnetic rings and two magnet sensitive elements placed 90° apart, which measure the radial component of the field generated by the magnet, and leading to two sinusoid signals in quadrature, which are used, after decoding, to detect the position over 360 degrees.

This patent solves the contact problem of U.S. Pat. No. 5,200,747, but the inconvenience linked to the previously developed incremental principle is not solved. Moreover, another inconvenience of this solution emerges in the presence of two sensors, which can lead a measuring error due to bad positioning of one sensor in relation to the other.

Also, the presence of two 90° spatially staggered integrated circuits increases the final cost of the sensor because the printed circuit surface can be large, and the number of connections is increased.

The same inconveniences linked to using increments are found in patent EP0699151, where the coarse signal is coded with 3 bits only, which limits the accuracy of the turn sensor, and moreover, it is realized with no less than 3 Hall sensors, From another point of view, patent application WO07057563 is known in the state of the art for describing a 360° rotary position sensor using a magnet sensitive sensor in order to determine the angular position of an appreciably diametrically magnetized magnetic ring or disk. In that patent, the sensor sensitive to the direction of the magnetic field generated by the magnet is placed outside of the magnet enabling thus to obtain a through-shaft rotary sensor intended for example to measure the rotation angle of a steering column. Moreover, the use of the sensor associated to a movement reduction is described in this application in order to reduce a several turn rotation to a rotation less than or equal to one turn at the sensor (see FIG. 2). The major inconvenience of this solution comes from using a n reduction ratio, decreasing the resolution and accuracy by as much, which can be insufficient for a steering column application where accuracy and resolution are very high.

This invention intends to solve the aforementioned problems by using two 360° non-contact sensors for producing an absolute multi-turn sensor. The first non-contact sensor is used to measure the rotation angle of the rotary organ from 0 to 360°, and the second sensor is used to determine the number of complete rotations of the rotary organ.

A mechanical system of continuous n ratio reduction is integrated between the two sensors. The input shaft of the reducer is linked to the first sensor, and the rotor of the second sensor is linked to the output shaft of the reducer. Each time that first sensor makes a complete turn, the second sensor only makes 1:n turn. The second sensor enables to obtain a measure of the total absolute angle with limited accuracy and resolution, but the first sensor solves this problem by enabling to refine the measure of the second sensor and thus to obtain a very fine accuracy and resolution over 360°. In case of first sensor failure, the second can nevertheless detect (n times reduced resolution) the position in the turn of the rotary organ, and detect the malfunction of the first sensor.

The solution hereafter described enables thus to increase the reliability of the measurements while adapting it advantageously to different geometric configurations (2 turn, 3 turn sensor etc., with the same accuracy and resolution whatever the number of turn), notably in the case of a through-axis device.

The invention may, according to a preferential configuration, use 2 sensors of the type described in application WO 2007/057563.

A first sensor, called Main, measures the wheel angle over a 360° excursion and delivers a signal proportional to this angle over said excursion. For a greater angle, the signal delivered is identical to that delivered for an identical modulo 360° angle. This signal alone let know the steering wheel position relative to the initial position, but not its absolute position. Indeed, the first sensor delivers a periodic signal of 360° period. The measure of the angle is precise within this period but doesn't let know in which period the shaft is located.

The second sensor has for function, on the one hand, to indicate what period the first sensor is at any moment, and, on the other hand, to bring a certain redundancy, since the signal is certainly less precise, although sufficiently so to enable its comparison to a range of values in correlation with the first sensor signal. Indeed, if the delivered signal is outside the expected range, a system malfunction can be inferred.

Several possibilities exist to generate the second sensor signal.

Patent application WO 2005/076860 describes a way to generate a incremental second signal (Geneva drive), therefore the signal indicates correctly which turn the first sensor is in, but the fact that the signal is discrete (using incremental values) does not allow to use it for redundancy.

The invention consists in using a mechanical means for continuous speed reduction between the main shaft (reference 1 in FIG. 11) and the second sensor, so that the angular mechanical position of the second sensor is appreciably proportional to the angular position to be measured from the main shaft.

The signal of the first sensor is proportional to the input shaft angle, up to 360°, and it is periodic with a 360° period. It provides a fine indication of the position for one turn.

The signal of the second sensor is appreciably proportional to the input shaft angle over the whole excursion, while being less precise than the signal of sensor 1.

It provides a rough indication of the position over the whole excursion.

Advantageously, the electronic combination of both signals enables to synthesize a signal proportional to the input shaft position over the whole excursion, of the same type as signal 2, but with the accuracy of signal 1. The benefit is therefore significant in term of accuracy and resolution.

The man of the art knows several means to realize a speed reduction from one shaft to the other. The most advantageous ones from a size point of view, for reduction ration in the order of 3 to 5, are as follows:

wheel and worm reduction,
gear train reduction,
direct reduction by gear-wheel: this solution is possible although not advantageous from a size point of view,
reduction by magnetic torquing.

Both signals, as represented FIG. 1, may be exported, e.g. toward a microcontroller, which from signals 1 and 2 will generate an increasing monotonous signal of significantly improved accuracy and resolution in relation to signal 2.

The invention will be better understood from looking at FIG. 1 to 20, which illustrate examples of preferential embodiments but are not limited to this type of high accuracy multi-turn absolute angular sensor with built-in redundancy.

This invention also concerns the domain of torque sensors and rotary magnetic position for angles equal to or greater than 360°, and up to several turns, and more particularly of torque and position sensors intended for measuring torsion in a steering column and the angular position of a car steering column, without limitation to this application.

The torque exerted by the driver on the steering column is information necessary to determine the level of power steering, which in turn allows the driver to turn the wheel more easily. The information about torque and steering column position is thus put together to optimize vehicle assistance and stability. This invention proposes a solution that properly associates a sensor for position greater than or equal to 360°, and a magnetic torque sensor, e.g., as described in patent FR2872896. Thus, this solution offers an easy installation and a very compact integration, with optimized sensitivity and parts of minimal size and weight. In the state of the art, one can find torque and position solutions but they are merely a classic torque sensor and a position sensor set next to each other. For example patent US2006 0236784 presents a solution with a torque sensor and a multi-turn position sensor, but it is merely a magnetic torque sensor set next to a magnetic multi-turn position sensor. This entails to an important congestion, the obligation to use several PCB or a flexible PCB because the Hall elements are in different planes and at a magnetic interaction between torque and position sensors.

That is why this invention proposes a solution to these inconveniences. Therefore, the new built-in sensor regrouping a torque and position sensor comprises four distinct magnetic structures:

a first rotary magnetic structure containing a plurality of radially magnetised magnets attached on a breech, and belonging to the torque sensor, a second stator magnetic structure including two concentric rings presenting a plurality of teeth belonging to the torque sensor, a third stationary collector structure consisted of two concentric ring portions extended with closing arms to form a measuring gap where a magnet sensitive element is placed, which belongs to the torque sensor, a fourth structure comprises a diametrically magnetized (or Halbach's) magnet placed between the rings of the stator part, and that can be thus moulded from a casting over the plastic piece supporting the second magnetic structure of the torque sensor. A MLX 90316 or other type of magnet sensitive element is placed outside of the position magnet sensor and belongs to the same PCB as the magnet sensitive element of the torque sensor.

This construction enables to obtain a torque and position sensor which is thus identical in axial size to a torque only sensor. In this configuration, the torque sensor magnet and the position sensor magnet are concentric and all Hall elements are located in the magnets median plane which is perpendicular to the rotating shaft of the sensors. Its advantage is to enable inserting all Hall elements on a single PCB, and canceling magnetic interaction from one sensor onto the other.

Moreover the cost of such an integrated sensor is reduced by pooling the pieces that compose it: The position sensor magnet and torque sensor concentric rings can be mould from a casting at the same time, and thus can form a single piece, and similarly the Hall sensors of the torque and position sensor are all part of the same unique PCB.

To this construction, we can add a reduction and an absolute position sensor as described in the first part of this patent.

In an advantageous way, both detection systems are positioned one close to the other, in order to be integrated in a single housing. The device so realized is compact and therefore can be easily positioned on a device to monitor.

The invention will be better understood from looking at FIG. 21 to 25, which illustrate examples of preferential embodiments, although non exclusive, of this type of high accuracy multi-turn absolute angular sensor, with built-in redundancy.

Figure 12:
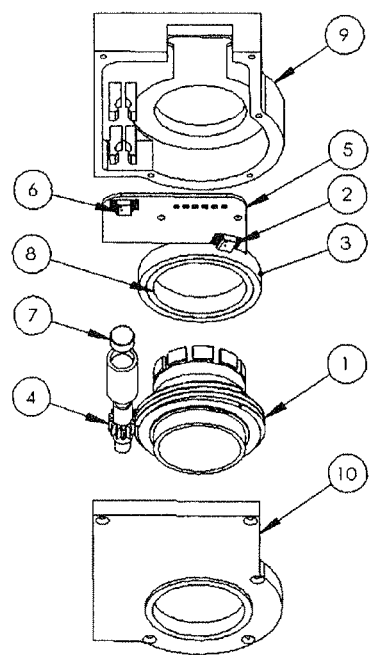
Figure 13:
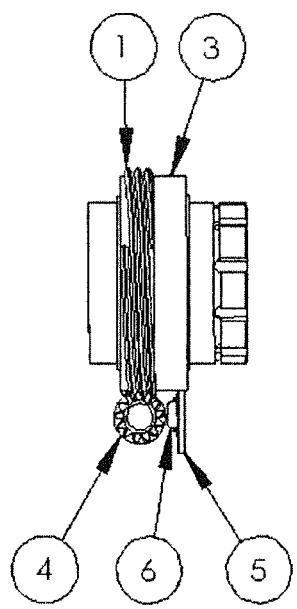
Figure 14:
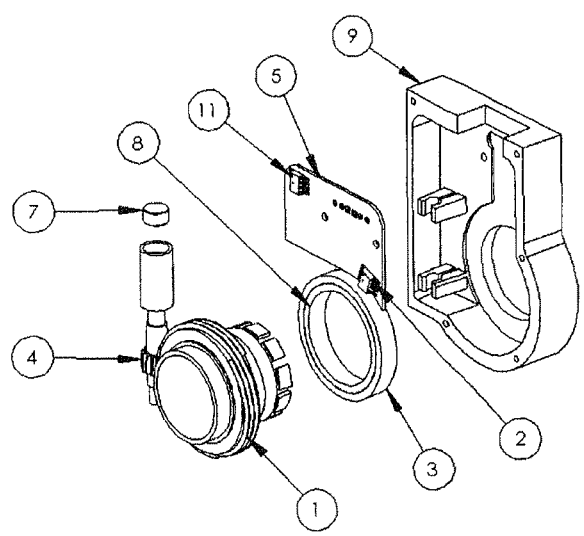
Figure 15:
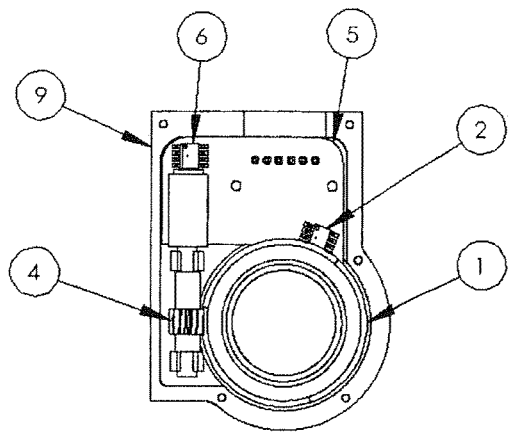
Figure 16:
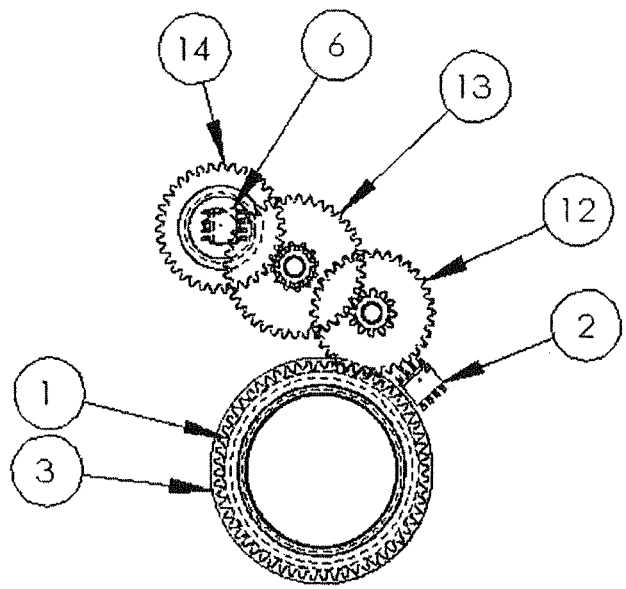
Figure 17:
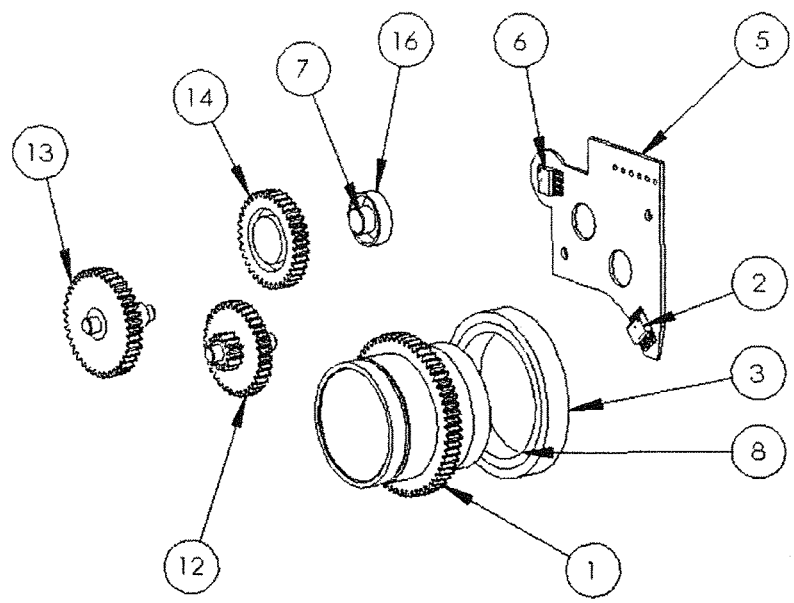
Figure 18:
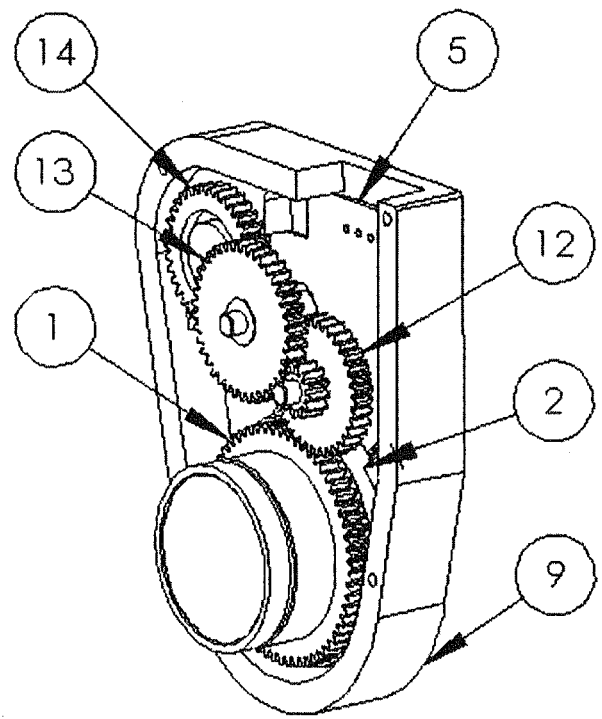
Figure 19:
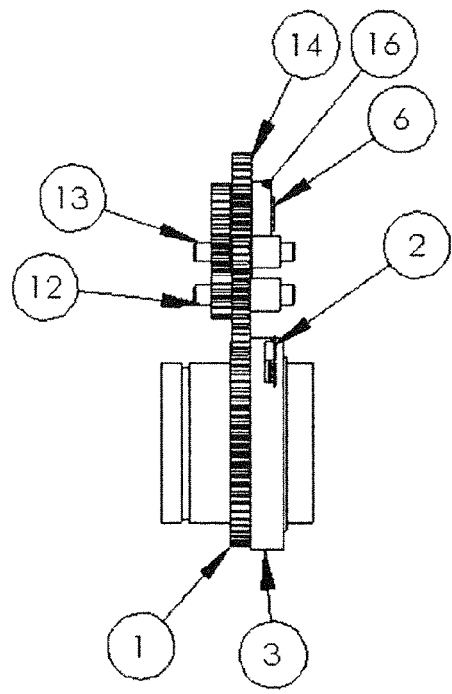
Figure 20:
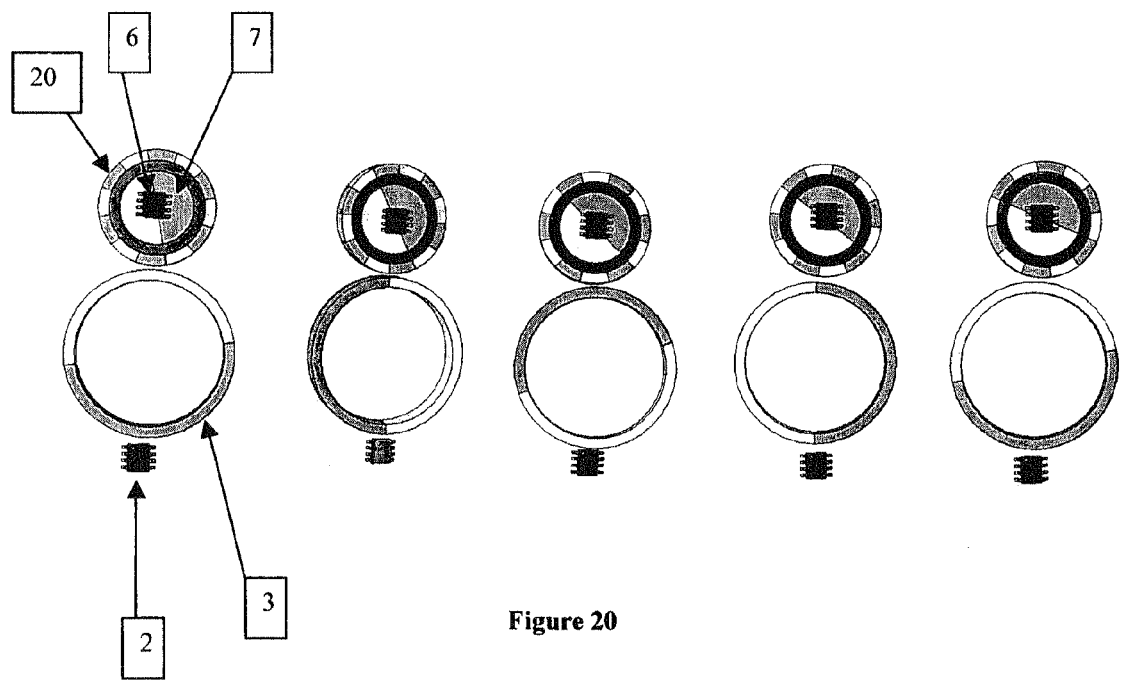
Figure 21:
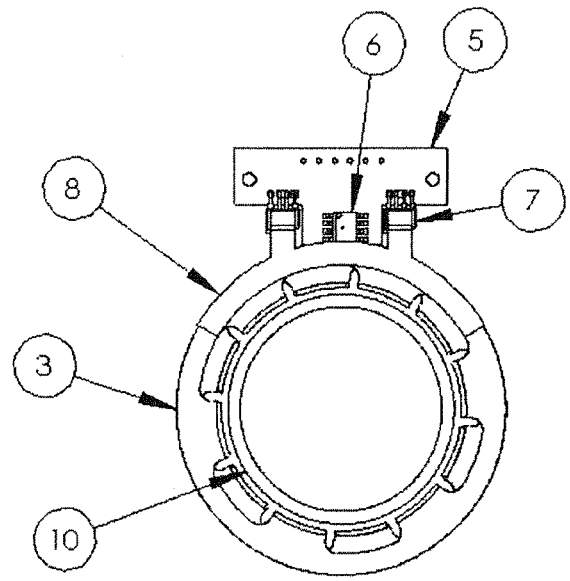
Figure 22:
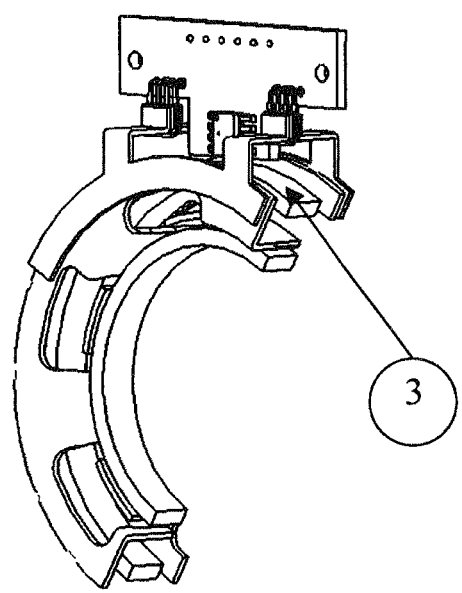
Figure 23:
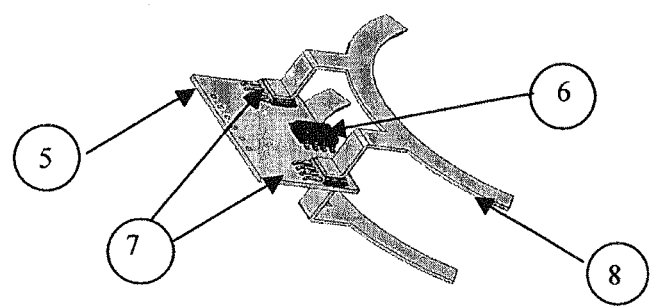
Figure 24:
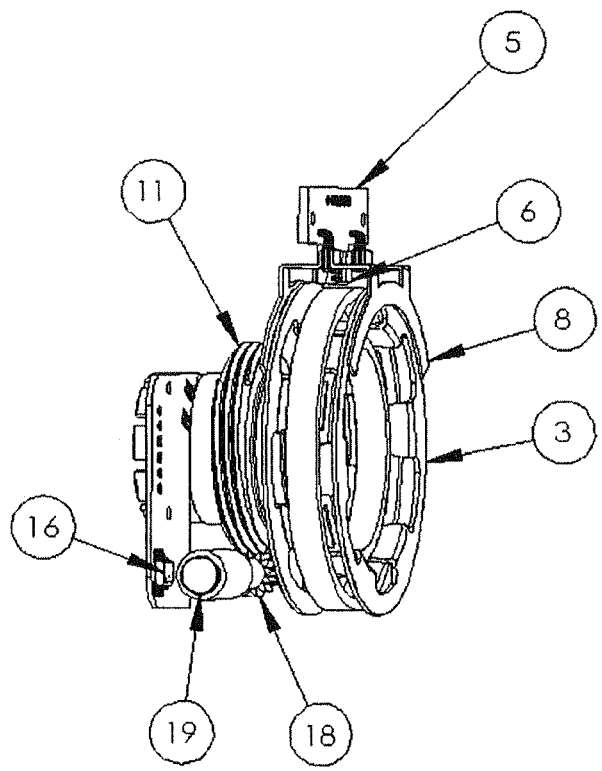
Figure 25:
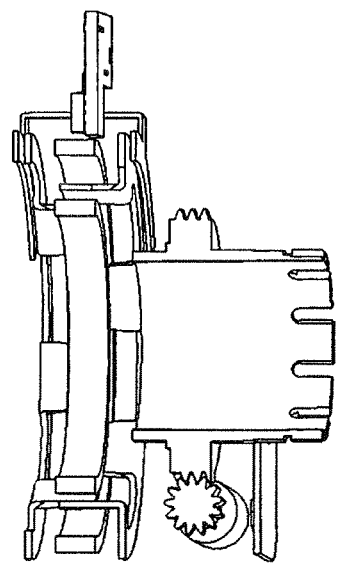
Figure 26:
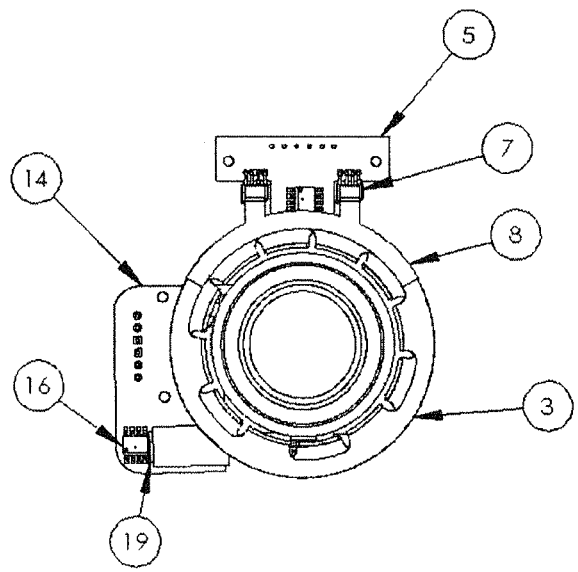

FIG. 1, from the anterior art, shows a single-turn solution,

FIG. 2, from the anterior art, shows a multi-turn solution, with reducer+single-turn sensor, FIG. 3, from the anterior art, shows output signals of a discontinuous multi-turn solution, FIG. 4, from the anterior art, shows a multi-turn magnetic solution with discontinuous reduction system, FIG. 5, from the anterior art, presents a multi-turn potentiometric solution with discontinuous reduction system, FIG. 6, from the anterior art, shows output signals of a discrete multi-turn solution, FIG. 7, from the anterior art, shows a multi-turn solution with signal phase difference through two sprocket wheels with slightly different teeth, FIG. 8, from the anterior art, represents two output signals with increasing phase difference, FIG. 9, from the anterior art, shows a multi-turn solution at shaft extremity, FIG. 10 is a diagram showing the output signals of the 2 sensors, FIG. 11 presents a front view of the invention with wheel and worm, FIG. 12 presents an exploded view in perspective from the top of the complete sensor with wheel and worm, FIG. 13 shows the elements of FIG. 11 seen from underneath, FIG. 14 is an exploded view in perspective, lid off, of the invention with wheel and worm, FIG. 15 is an overview, in front elevation, lid off, of the invention with wheel and worm, FIG. 16 is a see-through view without lid of the invention with reduction by cluster, FIG. 17 is an exploded view in perspective of the sensor with reduction by cluster, housing off, FIG. 18 is a view in perspective of the invention with reduction by cluster, FIG. 19 is a side view of the invention with reduction by cluster, housing removed, FIG. 20 is a view of the invention with magnetic reducer comprising the main magnet and the in-position coupling magnet, FIG. 21 is a front view a torque sensor associated to the 360° main position sensor, FIG. 22 is a cross-section view of a torque sensor associated to the 360° main position sensor, FIG. 23 is a view of the ASICS of the integrated torque and position sensor on the same PCB, FIG. 24 is a view in perspective of the association of a torque sensor, of the 360° main position sensor, and of the secondary sensor with worm movement transformation, FIG. 25 is a front elevation view of the association of a torque sensor, of the 360° main position sensor, and of the secondary sensor with worm movement transformation, FIG. 26 is a side view of the association of a torque sensor, of the 360° main position sensor, and of the secondary sensor with worm movement transformation,

DETAILED DESCRIPTION OF THE FIGURES

FIG. 1 to 9 are the figures representing the prior art as described in the first part of this patent.

FIG. 10 shows the output signals of this invention. The first signal is a periodic signal over 360° (1 turn) at a very fine resolution and the second signal is an absolute signal over 4 turns at a resolution 4 times less than the periodic signal.

FIG. 11 to 15 show the use of a reducer with wheel and worm. Large diameter worm (1) is hollow for mounting around the shaft to be measured, e.g. an automotive vehicle steering column. Said worm is attached to the shaft to be measured. A diametrically magnetized first magnet (3) is linked to said worm and is part of the first sensor, with precise signal over one turn. This magnet can be mounted on a magnetic breech (8), or not. Said worm is in pin with sensor housing (9), said housing being stationary in the application. This worm drives a sprocket (4) in rotation to which a second magnet (7) is linked, part of the second magnetic sensor with signal less precise but extending over the entire excursion (FIG. 10, signal no 2). Said sprocket is in pin with the housing (9). The angular excursion of automotive vehicle steering wheels ranges in most cases between 2 and 5 turns, without these values being exhaustive. The reduction ratio is chosen so that the turn pointer magnet (7) makes a little less than a turn over the entire excursion. It is indeed this angular excursion that enables to profit best from the possibilities of the second sensor, in term of resolution. In the illustrated example, worm (1) has 3 threads and sprocket (4) has 13 teeth. The reduction ratio is therefore of 4.33, which makes that it fit for a 4 turn excursion steering wheel. The movement transformation tolerates a little slack, but it should be limited to strict necessity, so as not to excessively decrease the accuracy of the second sensor by adding a parasitic hysteresis linked to slack in the reduction.

Sensor 2 measures the radial and tangent components of magnet 3, which is diametrically magnetized.

Sensor (6) measures the axial and tangent components of magnet (7), which is diametrically magnetized.

The choice of this type of construction enables to have a compact sensor with few parts, and these parts can easily be mass produced from plastic injection at a reduced cost. In addition, this structure enables to place the 2 sensors (2 and 6) on the same PCB (5), with a non negligible benefit from a manufacturing cost point of view.

FIG. 16 to 19 show the use of a cluster reducer:

A first wheel (1), hollow, is linked to the shaft, which angular position needs to be measured. Said shaft passes through wheel (1).

A first diametrically magnetized magnet (3) is linked to said wheel and is part of the 1st sensor, with fine signal over one turn (FIG. 10, signal n°1). A second mobile (12), comprising a sprocket and a wheel, meshes with first wheel (1). A third mobile (13) similar to the second one meshes with it, and drives a fourth mobile (14) in rotation. All said mobiles are in pin inside housing (9). Such assembly of mobiles, called cluster, achieves an angular velocity reduction of wheel 1.

The 4th mobile carries a diametrically magnetized magnet (7) and a soft iron ring (16) that operates as a magnetic shield.

Said second magnet (7) is part of the coarse signal second sensor (FIG. 10, signal n°2), but extends over the entire excursion.

Said second sensor may have a through-shaft or not, the pin between 4th mobile (14) and housing (9) being possibly offset. The magnet field components measured by the sensor are thus 2 radial components, orthogonal one to the other, over one point of the magnet rotating shaft in the case of a non through-shaft, or the radial and tangent components in one point outside the magnet in the case of a through-shaft.

In the same way as in the previous example, the reduction ratio is chosen so that 4th mobile (14) and therefore magnet (7) make a little less than one turn over the input shaft entire excursion.

The number of mobiles can be modified to fit size constraints or the required excursion.

The torque to be transmitted being extremely small, the sprocket teeth can be made with a low pressure angle, e.g. 12°, so as to maximally limit the slack that impact accuracy of the second sensor. Indeed, although the required accuracy is not very high for the turn decoding function, it is a lot higher for the redundancy function.

All mobiles as well as housing (9) that holds them can be realized economically with plastic injection. Sensors (2 and 6) are welded on a unique PCB (5) what makes the process economical.

In the illustrated example, the chosen sprockets are:—
input wheel 1: 60 teeth,
wheel 12: 12 and 34 teeth,
wheel 13: 12 and 39 teeth,
output wheel 14: 35 teeth.

This yields a 5.37 reduction ratio. Therefore, the example illustrated here represents a 5 turn excursion steering wheel.

FIG. 20 illustrates the use of a direct magnetic connection.

In the example illustrated, diametrically magnetized magnet ring (3) is linked to the shaft which rotation needs to be measured. A multipolar magnet rings (20) placed in the same plane and in pin with the housing interacts with it. Indeed the north and south poles alternate face with the south and north poles of main magnet (3), thus realizing an angular velocity reduction between the 2 magnets. The can of the art knows well such non-contact magnetic reduction systems that permit to achieve reductions through non magnetic thin walls or without direct mechanical contact between wheels.

In the example illustrated, primary shaft magnet (3) has one pair of poles, secondary shaft magnet (20) has 6 pairs of poles, providing a reduction ratio of 6 between the 2 shafts, and making the system fit to measure wheel excursions of about 6 turns.

A bipolar magnet (7) placed in the center of the secondary wheel enables to capture the angular position of the secondary wheel in the same way as in the previous example. Main magnet (3) is linked in a rigid way to the steering column, enabling to measure precisely its position.

FIGS. 21 and 22 are front and cross-section views of the very compact assembly of the torque sensor and the 360° absolute position sensor. This assembly regroups:
a torque sensor composed of a two stator multipolar magnet (10), two collectors (8), two magnet sensitive elements (7) mounted on one PCB (5),
a position sensor comprising a diametrically magnetized magnet (3) properly placed between 2 stators in order to optimize the assembly size, and a sensor (6) that measures the axial and tangent components of magnet (3) is placed on PCB (5). So magnet (3) can be moulded from a cast at the same time as the stators, and the torque and position measurement, using a magnet sensitive element, is made in a same plane.

FIG. 23 is a view of the 2 ASIC Hall of torque sensor (7), of the ASIC Hall for the 360° position sensor, of the unique PCB onto which the ASICs are built-in, and of the torque sensor collecting structure.

FIGS. 24 and 25 and 26 are respectively a perspective view, a cross-section, and a front elevation view of a torque sensor and a multi-turn absolute position sensor assembly. This assembly regroups:
a torque sensor comprising a two stator multipolar magnet (10), two collectors (8), two magnet sensitive elements (7) assembled on one PCB (5),
a detection system that generates a signal according to a "periodic" function of period theta/n yielding the periodic angular position, comprising a diametrically magnetized magnet (3) that is properly placed between the 2 stators in order to optimize the assembly size,
and a sensor (6) that measures the axial and tangent components of magnet (3) placed on PCB (5),
a detection system that generates an absolute signal over an excursion theta, comprising a wheel (18) and worm (11) reducer (see description in FIG. 11 to 15) of a diametrically magnetized magnet (19), and of a sensor (16) measuring the axial and tangent components of magnet (19).

As it may be observed notably in FIG. 11 to 19, both detection systems, or sensors (2) and (6), are advantageously positioned close to each other in order to realize a compact sensor assembled in a single housing.

The invention claimed is:

1. A multi-turn absolute position magnetic sensor for measuring the angular position over an excursion theta of a shaft passing through said sensor, and comprising at least two systems for detecting the position of the shaft, wherein:
at least one of the detection systems includes a mechanical system for continuous movement transformation of which the input shaft is linked to said shaft, aforesaid at least one detection system generating a signal according to a "periodic" function of period theta/n yielding the periodic angular position of said shaft;

at least one of the detection systems generates an absolute signal over an excursion theta of aforesaid shaft; and Theta and n verify the relations:

*Theta/$n$=360

*$n$>1.

2. The multi-turn absolute position magnetic sensor according to claim 1, wherein the detection system that generates a signal according to a "periodic" function of period theta/n providing the periodic angular position of said shaft, includes at least 2 magnet sensitive elements located appreciably at the same point and measuring the tangent or radial or axial component of the magnetic field created by a magnet, and the radial or axial or tangent magnetic field component in order to provide 2 sinusoid signals appreciably 90° out of phase.

3. The multi-turn absolute position magnetic sensor according to claim 2, wherein the detection system that generates an absolute signal over an excursion theta of aforesaid shaft includes at least one magnet on the output shaft of the mechanical system for continuously transforming movement, and at least one magnet sensitive element.

4. The multi-turn absolute position magnetic sensor according to claim 3, wherein said detection system that generates an absolute signal over an excursion theta of said shaft, includes at least 2 magnet sensitive elements localized appreciably at the same point, which are measuring the magnetic field tangent or radial or tangent component and the magnetic field radial or axial or tangent component in order to provide 2 sinusoid signals appreciably 90° out of phase.

5. The multi-turn absolute position magnetic sensor according to claim 4, wherein the magnet sensitive elements of the detection system that generates a signal according to a "periodic" function of period theta/n providing the periodic angular position of aforesaid shaft and that or those of the detection system that generates an absolute signal on an excursion theta of aforesaid shaft are coplanar.

6. The multi-turn absolute position magnetic sensor according to claim 5, wherein the magnet sensitive elements are connected to the same connection plane.

7. The multi-turn absolute position magnetic sensor according to claim 5, wherein the mechanical system for continuous transformation of movement is a wheel or worm reducer.

8. The multi-turn absolute position magnetic sensor according to claim 5, wherein the mechanical system for continuous transformation of movement is a non-contact reducer comprising at least 2 multipolar magnets of which at least 1 is linked to aforesaid shaft.

9. The multi-turn absolute position magnetic sensor according to claim 7, wherein the multipolar magnet of the reducer linked to aforesaid shaft is also the detection system magnet that generates a signal according to a "periodic" function of period theta/n providing the periodic angular position of aforesaid shaft.

10. The multi-turn absolute position magnetic sensor according to claim 8, wherein the multipolar magnet of the reducer linked to the system for continuous transformation of movement is also the detection system magnet that generates an absolute signal over an excursion theta of aforesaid shaft.

11. The multi-turn absolute position magnetic sensor according to claim 1, wherein the circuit for processing the signal realizes a calculation of the very precise absolute position of aforesaid shaft over the entire excursion theta using the electrical signals from both detection systems.

12. The multi-turn absolute position magnetic sensor according to claim 1, wherein both detection systems are positioned close to one another in order to be built in a single housing.

13. An assembly of a position sensor for detecting the torsion of a steering column, comprising:
at least one detection system of relative angular position +/−PHI, where PHI >20, of a coaxial input and output shaft connected by a torsion bar to deduct the torsional torque exerted on the bar, consisting of a first rotoric magnetic structure including a plurality of radially oriented magnets, of a second stator structure including two rings extended by teeth near which at least one magnet sensitive element is placed,
at least one detection system of absolute position according to claim 1 for measuring the angular position on an excursion theta of the input or output shaft; and
at least one signal processing system,
wherein
at least one detection system generates a signal according to a "periodic" function of period theta/n providing the periodic angular position of aforesaid shaft;
at least one detection system generates an absolute signal over an excursion theta of aforesaid shaft;
Theta, PHI and n verifies: Theta/n=360

Theta/Phi>20

$n$>=1 that aforesaid detection system shaft is also the input or output shaft of the torque sensor.

14. The assembly of the position sensor according to claim 13, wherein the torque sensor includes a third stationary collecting structure consisting of two flow closing parts that define at least one gap within which at least one magnet sensitive element is placed.

15. The assembly of the position sensor according to claim 14, wherein the torque sensor flow closing part and the stator rings define between them a constant and independent collection surface of the relative radial position of both stator and collecting structures.

16. The assembly of the position sensor according to claim 13, wherein the magnet sensitive elements of the detection system that generates a signal according to a "periodic" function of period theta/n providing the periodic angular position of aforesaid shaft and/or that or those of the detection system that generates an absolute signal on an excursion theta of aforesaid shaft, is in the same plane as the magnet sensitive element(s) of the sensor provided for measuring torsion.

17. The assembly of the position sensor according to claim 13, wherein at least one shield is built-in between the sensor provided for measuring torsion and the position detection systems of aforesaid shaft.

18. The assembly of the position sensor according to claim 13, wherein the magnetic subassemblies of the torque and position sensor are mould from a casting.

* * * * *